United States Patent
Fujii (10) Patent No.: US 11,435,537 B2
(45) Date of Patent: Sep. 6, 2022

(54) METHOD AND APPARATUS FOR MEASURING OPTICAL CHARACTERISTICS OF OPTICAL MODULATION DEVICE, AND NON-TRANSITORY COMPUTER-READABLE MEDIUM

(71) Applicant: SUMITOMO ELECTRIC INDUSTRIES, LTD., Osaka (JP)

(72) Inventor: Kosuke Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/208,621

(22) Filed: Mar. 22, 2021

(65) Prior Publication Data

US 2021/0311268 A1 Oct. 7, 2021

(30) Foreign Application Priority Data

Apr. 3, 2020 (JP) .............................. JP2020-067595

(51) Int. Cl.
  *G02B 6/42* (2006.01)
  *G01M 11/02* (2006.01)

(52) U.S. Cl.
  CPC ....... *G02B 6/4225* (2013.01); *G01M 11/0207* (2013.01); *G02B 6/4227* (2013.01)

(58) Field of Classification Search
  CPC .......................... G02B 6/4225; G02B 6/4227
  See application file for complete search history.

(56) References Cited

U.S. PATENT DOCUMENTS

| | | | |
|---|---|---|---|
| 9,625,662 B2* | 4/2017 | Luk | ...................... H04B 10/697 |
| 2020/0073057 A1 | 3/2020 | Fujii | |
| 2021/0011216 A1 | 1/2021 | Fujii | |

FOREIGN PATENT DOCUMENTS

| | | |
|---|---|---|
| JP | 2015-206977 | 11/2015 |
| JP | 2020-034862 | 3/2020 |
| JP | 2021-012334 | 2/2021 |

* cited by examiner

*Primary Examiner* — Omar R Rojas
(74) *Attorney, Agent, or Firm* — Smith, Gambrell & Russell, LLP.

(57) ABSTRACT

A method for measuring optical characteristics of a Mach-Zehnder type optical modulation device having an incident part, a waveguide for propagating light incident from the incident part, and a plurality of emitting parts each for emitting light. The method includes inputting light from a light source to the incident part of the optical modulation device through a first optical fiber, receiving emitted lights emitted from the plurality of emitting parts of the optical modulation device by a plurality of light receivers, obtaining a total value of currents by converting electric signals into currents and summing the currents, the electric signals being outputted by the plurality of light receivers receiving the emitted lights, and aligning the incident part of the optical modulation device and the first optical fiber based on the total value of currents.

9 Claims, 6 Drawing Sheets

METHOD AND APPARATUS FOR MEASURING OPTICAL CHARACTERISTICS OF OPTICAL MODULATION DEVICE, AND NON-TRANSITORY COMPUTER-READABLE MEDIUM

CROSS-REFERENCE TO RELATED APPLICATION

This application claims priority based on Japanese Patent Application No. 2020-067595 filed on Apr. 3, 2020, and the entire contents of the Japanese patent application are incorporated herein by reference.

FIELD OF THE INVENTION

The present disclosure relates to a method and an apparatus for measuring optical characteristics of an optical modulation device, and a non-transitory computer-readable medium.

BACKGROUND ART

An optical modulation device of, for example, a Mach-Zehnder type is used in an optical communication system such as a quadrature phase shift keying (QPSK) system or the like. Such an optical modulation device includes a plurality of waveguides, an incident port and a plurality of emitting ports. The waveguide is provided with an optical modulation electrode and a phase-adjustment electrode.

In a measurement for optical characteristics of the optical modulation device, aligning the incident port of the optical modulation device and an optical fiber is carried out. There is a method for aligning them so as to maximize a photocurrent flowing in an electrode of the optical modulation device by an incidence of light (for example, Patent Document 1: Japanese Unexamined Patent Application Publication No. 2015-206977).

SUMMARY OF THE INVENTION

A method for measuring optical characteristics of an optical modulation device according to the present disclosure is a method for measuring optical characteristics of a Mach-Zehnder type optical modulation device having an incident part, a waveguide for propagating a light incident from the incident part, and a plurality of emitting parts each for emitting the light. The method includes a step of inputting a light from a light source to the incident part of the optical modulation device through a first optical fiber, a step of receiving emitted lights emitted from the plurality of emitting parts of the optical modulation device by a plurality of light receiving parts, a step of obtaining a total value of currents by converting electric signals into the currents and summing the currents, the electric signals being outputted by the plurality of light receivers in receiving the emitted lights, and a step of aligning the incident part of the optical modulation device and the first optical fiber based on the total value.

An apparatus according to the present disclosure is an apparatus for measuring optical characteristics of a Mach-Zehnder type optical modulation device having an incident part, a waveguide for propagating a light incident from the incident part, and a plurality of emitting parts each for emitting the light. The apparatus includes a first optical fiber configured to input a light emitted from a light source to the incident part of the optical modulation device, a plurality of light receivers configured to output electric signals by inputting the emitted lights emitted from the plurality of emitting parts of the optical modulation device, a current converter configured to obtain a total value of currents by converting the electric signals outputted by the plurality of light receivers into the currents and summing the currents, and a controller configured to align the incident part of the optical modulation device and the first optical fiber based on the total value.

A non-transitory computer-readable medium according to the present disclosure causes a computer to a process. The computer is used for measuring optical characteristics of a Mach-Zehnder type optical modulation device having an incident part, a waveguide for propagating a light incident from the incident part, and a plurality of emitting parts each for emitting the light. The process includes a step of inputting a light emitted from a light source to the incident part of the optical modulation device through a first optical fiber, a step of obtaining a total value of currents by converting electric signals into the currents and summing the currents, the electric signals being outputted by the plurality of light receivers in receiving the emitted lights from the plurality of emitting parts of the optical modulation device, and a step of aligning the incident part of the optical modulation device and the first optical fiber based on the total value.

DESCRIPTION OF EMBODIMENTS

As a method for aligning an optical fiber with an optical modulation device, there is a method for aligning the optical fiber with the optical modulation device based on the power of a light outputted from an optical modulation device. However, the balance of optical powers between a plurality of emitting ports of the optical modulation device changes for each optical modulation device. That is, the power of a light emitted from one emitting port changes for each optical modulation device. Therefore, it is difficult to automatically align the optical fiber with the optical modulation device while detecting the optical power of the emitted light. Accordingly, it is an object of the present disclosure to provide a method, an apparatus, and a non-transitory computer-readable medium that are capable of automatically aligning an optical modulation device and an optical fiber in measuring optical characteristics of an optical modulation device.

The method, the apparatus, and the non-transitory computer-readable medium for measuring optical characteristics of the optical modulation device according to the present disclosure enable automatic aligning of the optical modulation device and the optical fiber.

Description of Embodiments of the Present Disclosure

First, the embodiments according to the present disclosure will be listed and described. In the description, corresponding elements are denoted by the same reference numerals and redundant descriptions thereof will be omitted.

(1) An embodiment according to the present disclosure is a method for measuring optical characteristics of a Mach-Zehnder type optical modulation device having an incident part, a waveguide for propagating a light incident from the incident part, and a plurality of emitting parts each for emitting the light. The method includes a step of inputting a light from a light source to the incident part of the optical modulation device through a first optical fiber, a step of receiving emitted lights emitted from the plurality of emitting parts of the optical modulation device by a plurality of light receiving parts, a step of obtaining a total value of currents by converting electric signals into the currents and summing the currents, the electric signals being outputted by the plurality of light receivers in receiving the emitted lights, and a step of aligning the incident part of the optical modulation device and the first optical fiber based on the total value. For each optical modulation device, the balance of the intensities of lights emitted from the plurality of emitting parts changes. On the other hand, the total of the intensities is constant. Therefore, aligning the optical modulation device and the optical fiber can be automatically performed on the basis of the total value of the currents obtained by converting the electric signals.

(2) In the step of aligning the incident part of optical modulation device and the first optical fiber with, the aligning may be performed such that the total value is maximized. Aligning the optical modulation device and the optical fiber can be performed automatically on the basis of the total value.

(3) The incident part and the plurality of emitting parts may be provided on one surface of the optical modulation device. The method may include a step of facing an optical fiber array including the first optical fiber and a plurality of second optical fibers to the one surface of the optical modulation device before the step of inputting the light from the light source to the incident part. In the method, the step of receiving the emitted lights by the plurality of light receivers may be a step of receiving the emitted lights by the plurality of light receivers through the plurality of second optical fibers. By facing the optical modulation device to the optical fiber array, the incident part faces the first optical fiber, and the emitting part faces the second optical fibers. The incidence of the lights via the first optical fiber and the emission of the lights via the second optical fibers are allowed.

(4) The step of aligning the incident part of the optical modulation device and the first optical fiber may include adjusting a position of at least one of the optical fiber array and the optical modulation device based on the total value. At the same time as aligning the incident part of the optical modulation device and the first optical fiber, aligning each of the plurality of emitting parts and a corresponding second fiber of the plurality of second optical fibers can also be performed.

(5) The step of aligning the incident part of the optical modulation device and the first optical fiber may include a step of aligning the incident part of the optical modulation device and the first optical fiber without applying a voltage to an electrode provided on the waveguide of the optical modulation device, and a step of aligning the incident part of the optical modulation device and the first optical fiber with applying a voltage to an electrode provided on the waveguide of the optical modulation device. Since the two aligning steps are performed automatically, the aligning takes less time and effort as compared to a manual aligning.

(6) An apparatus according to an embodiment of the present disclosure is an apparatus for measuring optical characteristics of a Mach-Zehnder type optical modulation device having an incident part, a waveguide for propagating a light incident from the incident part, and a plurality of emitting parts each for emitting the light. The apparatus includes a first optical fiber configured to input a light emitted from a light source to the incident part of the optical modulation device, a plurality of light receivers configured to output electric signals by inputting emitted lights emitted from the plurality of emitting parts of the optical modulation device, a current converter configured to obtain a total value of currents by converting the electric signals outputted by the plurality of light receivers into the currents and summing the currents, and a controller configured to align the incident part of the optical modulation device and the first optical fiber based on the total value. For each optical modulation device, the balance of the intensities of lights emitted from the plurality of emitting parts changes. On the other hand, the total of the intensities is constant. Therefore, aligning the optical modulation device and the optical fiber can be automatically performed on the basis of the total value of the current obtained by converting the electric signals.

(7) The apparatus may include an optical fiber array in which the first optical fiber and a plurality of second optical fibers are arranged. The plurality of light receivers may receive the emitted lights through the plurality of second optical fibers. The controller may perform the aligning by adjusting a position of at least one of the optical fiber array and the optical modulation device based on the total value. The incident part faces the first optical fiber, and the emitting part face the second optical fibers. The incidence of the light via the first optical fiber and the emission of the lights via the second optical fibers are allowed. At the same time as aligning the incident part of the optical modulation device and the first optical fiber, aligning each of the plurality of emitting parts and a corresponding second fiber of the plurality of second optical fibers can also be performed.

(8) Each of the plurality of second optical fiber may have a larger diameter than the first optical fiber. By increasing the diameter of a light-receiving portion, optical coupling with the emitted light from each of the plurality of emitting parts can be increased, optical loss can be suppressed, and the emitted light can be propagated to each of the plurality of second optical fibers.

(9) A non-transitory computer-readable medium according to an embodiment of the present disclosure causes a computer to a process. The computer is used for measuring optical characteristics of a Mach-Zehnder type optical modulation device having an incident part, a waveguide for propagating a light incident from the incident part, and a plurality of emitting parts each for emitting the light. The process includes a step of inputting a light emitted from a light source to the incident part of the optical modulation device through a first optical fiber, a step of obtaining a total value of currents by converting electric signals into the currents and summing the currents, the electric signals being outputted by the plurality of light receivers in receiving the emitted lights from the plurality of emitting parts of the optical modulation device, and a step of aligning the incident part of the optical modulation device and the first optical fiber based on the total value. For each optical modulation device, the balance of the intensities of lights emitted from the plurality of emitting parts changes. On the other hand, the total of the intensities is constant. Therefore, aligning the optical modulation device and the optical fiber can be automatically performed on the basis of the total value of the currents obtained by converting the electric signals.

Details of Embodiments of the Present Disclosure

Specific examples of the method, the apparatus, and the non-transitory computer-readable medium for measuring the optical characteristics of the optical modulation device according to an embodiment of the present disclosure will be described below with reference to the drawings.

(Measuring Apparatus)

Figure 1:
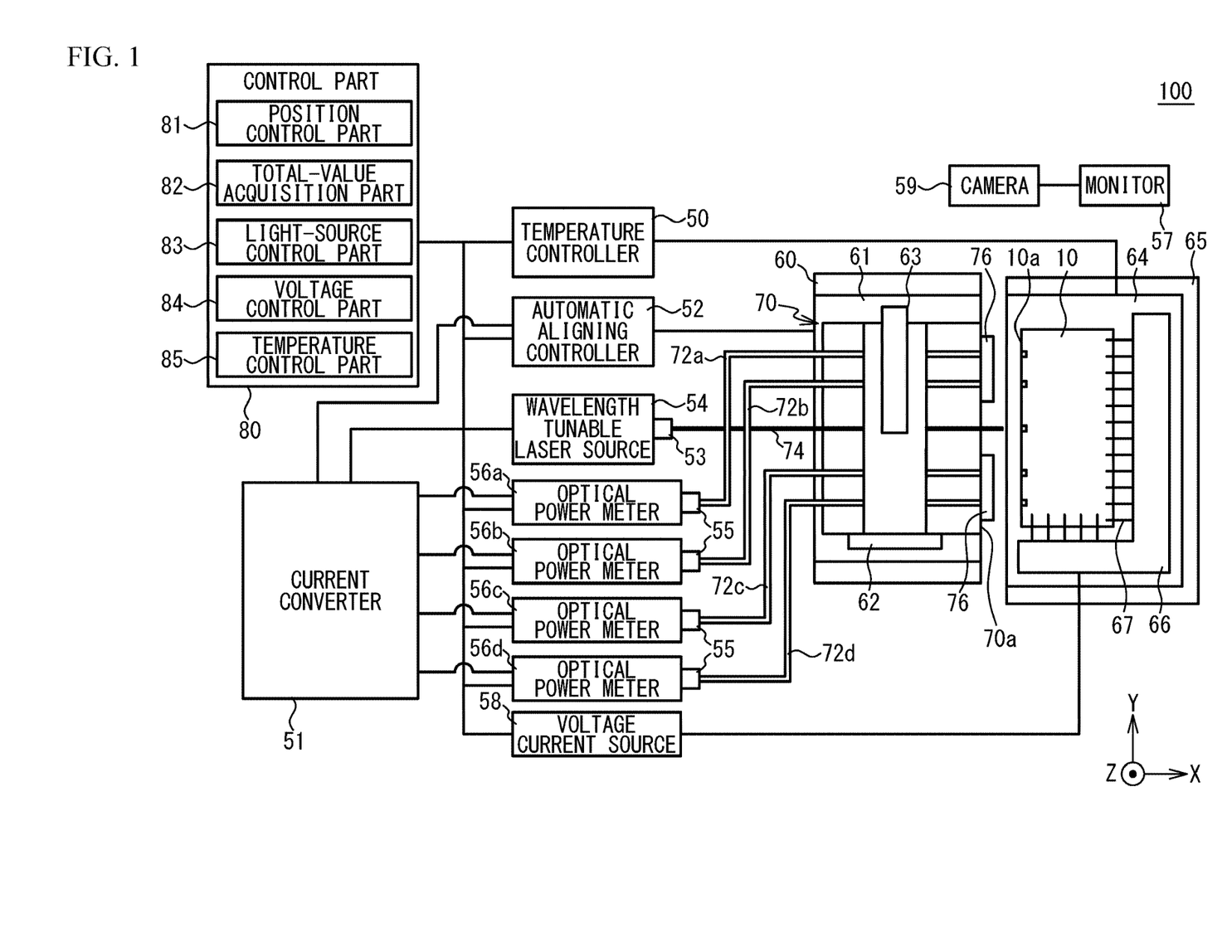
FIG. 1 is a schematic diagram illustrating a measuring apparatus according to an embodiment.

FIG. 1 is a schematic diagram illustrating a measuring apparatus 100 according to an embodiment. As illustrated in FIG. 1, the measuring apparatus 100 includes an optical fiber array 70, an aligning stage 60, a temperature control stage 64, an angle adjustment stage 65, a monitor 57, a camera 59, a temperature controller 50, an automatic aligning controller 52, a wavelength tunable laser source 54, a current converter 51 (current conversion part), four optical power meters 56a to 56d, a voltage current source 58, a multi-contact probe 66, and a control part 80.

The measuring apparatus 100 is an apparatus for measuring optical characteristics of an optical modulation device 10 by inputting a laser light into the optical modulation device 10 and receiving a light emitted from the optical modulation device 10. The measuring apparatus 100 is used, for example, in a step of an inspection of the optical modulation device 10.

An X-axis, a Y-axis, and a Z-axis illustrated in FIG. 1 are perpendicular to each other. The X-axis and the Y-axis are in parallel with respective sides of the optical fiber array 70, the aligning stage 60, the temperature control stage 64, the angle adjustment stage 65, and the optical modulation device 10. The Z-axis is perpendicular to the top surfaces of the optical modulation device 10 and the optical fiber array 70.

The aligning stage 60 is electrically connected to the automatic aligning controller 52. A folder 61 is provided on the aligning stage 60, and the optical fiber array 70 is mounted on the folder 61. The optical fiber array 70 includes optical fibers 72a to 72d and 74 extending in the X-axis direction. A fixing member 63 illustrated in FIG. 1 holds the optical fibers 72a to 72d and 74 from above to fix a plurality of optical fibers disposed on the optical fiber array 70. One end face in the Y-axis direction of the optical fiber array 70 is abutted on a jig 62 to align the optical fiber array 70 on the aligning stage 60. The jig 62 and the fixing member 63 are made of Teflon (registered trademark), for example.

The angle adjustment stage 65 is disposed at a position opposed to the aligning stage 60 in the X-axis direction. The temperature control stage 64 is mounted on the angle adjustment stage 65. The optical modulation device 10 is mounted on the temperature control stage 64. The temperature control stage 64 includes a Peltier element, for example, and is electrically connected to the temperature controller 50.

The multi-contact probe 66 is provided on the temperature control stage 64 and extends in the X-axis direction and the Y-axis direction. The multi-contact probe 66 is electrically connected to the voltage current source 58 and has a plurality of pins 67. The optical modulation device 10 is electrically connected to the multi-contact probe 66 via the plurality of pins 67.

The voltage current source 58 is a multi-channel direct-current power source. The voltage current source 58 is capable of applying a voltage to each of a plurality of electrodes in the optical modulation device 10 via the multi-contact probe 66 and measuring a current flowing in each of the plurality of electrodes.

The optical power meters 56a to 56d (light receivers) have photo detectors such as photodiodes, and output a voltage when light enters. The output voltage is proportional to the intensity of light. The current converter 51 converts the output voltage of each of the optical power meters 56a to 56d into a current and calculates the total of respective current values. The current converter 51 inputs the total value of the current values to the automatic aligning controller 52. The higher the intensity of the light, the higher the output voltage of each of the optical power meters 56a to 56d, and the higher the total value of the currents calculated by the current converter 51.

The camera 59 is disposed such that the surface of the optical modulation device 10 facing the optical fiber array 70 is in a field of view. The monitor 57 is connected to the camera 59, and displays an image to be captured by the camera 59. The monitor 57 displays a reference line serving as a reference for aligning the optical modulation device 10.

The control part 80 is a computer such as a personal computer, for example. The control part 80 is electrically connected to the temperature controller 50, the automatic aligning controller 52, the wavelength tunable laser source 54, the current converter 51, the four optical power meters 56, and the voltage current source 58.

The control part 80 includes a position control part 81, a total-value acquisition part 82, a light-source control part 83, a voltage control part 84, and a temperature control part 85. The temperature control part 85 controls a power applied from the temperature controller 50 to the temperature control stage 64 to regulate the temperature of the optical modulation device 10 on the temperature control stage 64. The voltage control part 84 controls the voltage current source 58, applies a reverse bias voltage to the optical modulation device 10, and obtains a value of the current flowing through the optical modulation device 10 from the voltage current source 58. The light-source control part 83 controls turning on/off of the wavelength tunable laser source 54 and also controls a wavelength and an intensity of a light emitted from the wavelength tunable laser source 54. The total-value acquisition part 82 obtains the total value of the current values calculated by the current converter 51. The position control part 81 controls the automatic aligning controller 52 based on the total value and adjusts a position of the optical fiber array 70 on the aligning stage 60.

Figure 2:
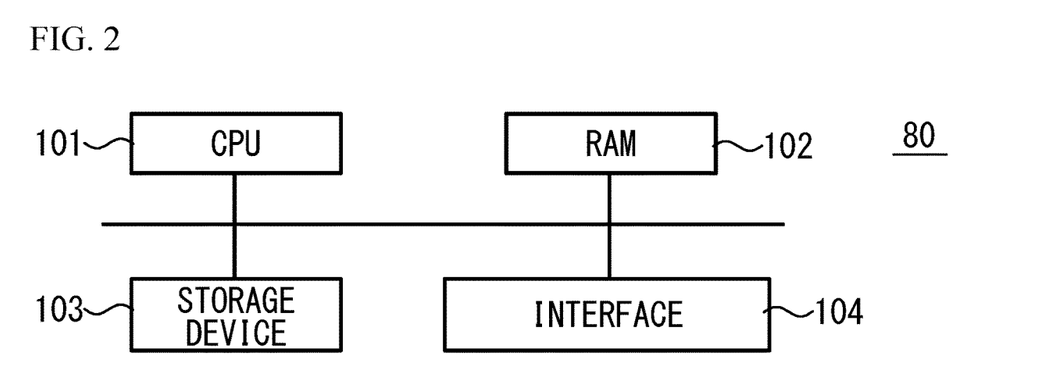
FIG. 2 is a block diagram illustrating a hardware configuration of a control part.

FIG. 2 is a block diagram showing a hardware configuration of the control part 80. As illustrated in FIG. 2, the control part 80 includes a CPU 101, a RAM 102, a storage device 103, and an interface 104. The CPU 101, the RAM 102, the storage device 103 and the interface 104 are connected to each other by buses or the like. The RAM 102 is a volatile memory that temporarily stores programs, data, and the like. The storage device 103 may be a ROM, a solid state drive (SSD) such as a flash memory, and a hard disc drive (HDD), or the like. The storage device 103 stores a program for executing an aligning to be described later, a program for confirming the operation of the optical modulation device 10, and the like.

The CPU 101 executes the programs stored in the RAM 102 to achieve the position control part 81, the total-value acquisition part 82, the light-source control part 83, the voltage control part 84, and the temperature control part 85 in the control part 80. Each part of the control part 80 may be hardware such as a circuit.

Figure 3A:
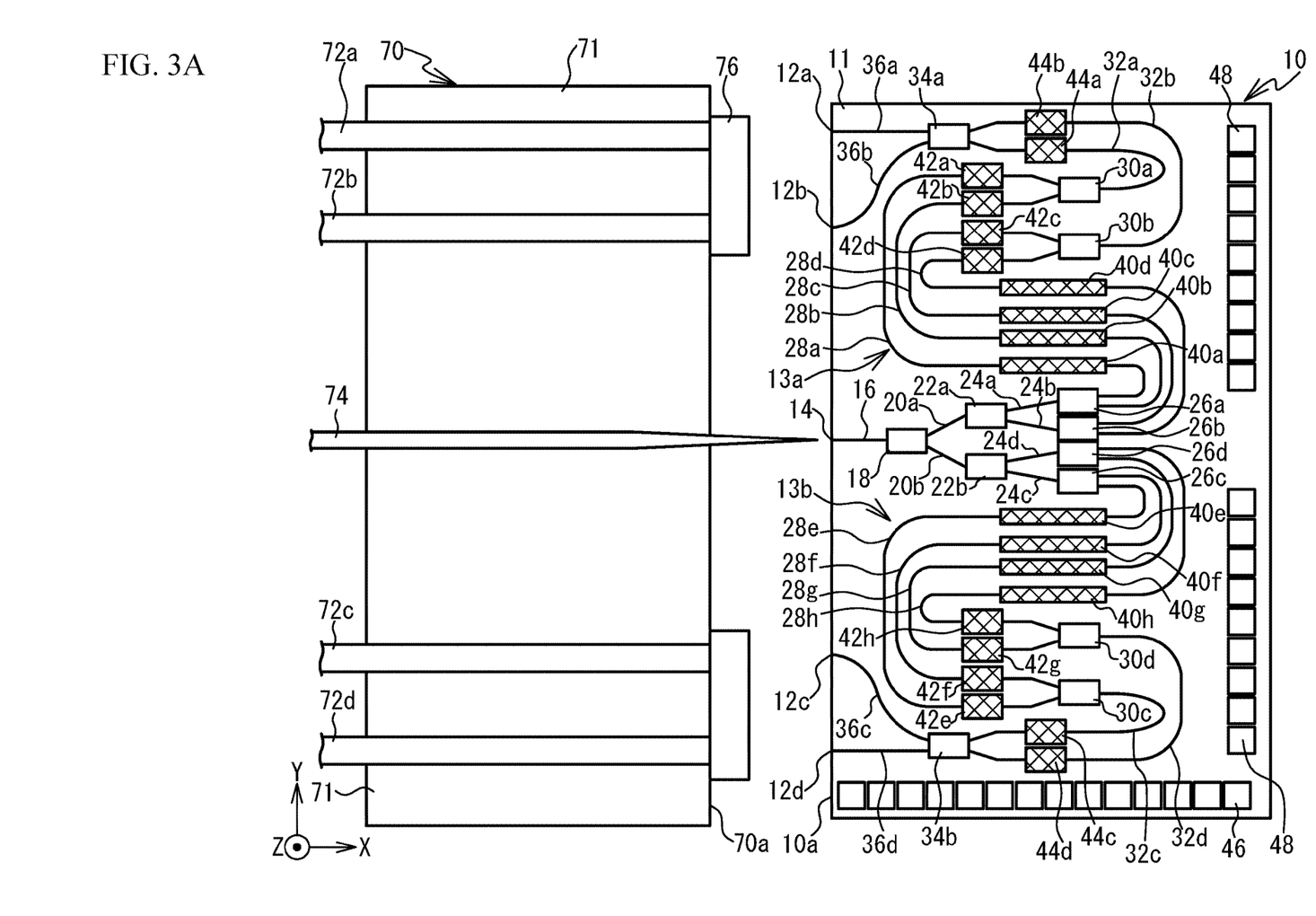
FIG. 3A is a plan view illustrating an optical fiber array and an optical modulation device.

FIG. 3A is a plan view illustrating the optical fiber array 70 and the optical modulation device 10. In FIG. 3A, the aligning stage 60, the jig 62, the fixing member 63, the temperature control stage 64, the angle adjustment stage 65, and the multi-contact probe 66 are omitted. As illustrated in FIG. 3A, the optical fiber array 70 and the optical modulation device 10 face each other in the X-axis direction.

(Optical Fiber Array)

The optical fiber array 70 includes a base plate 71, the optical fibers 72a to 72d and the optical fiber 74. The length of the base plate 71 in the X-axis direction is 3 mm or more and 30 mm or less, for example. The width of the base plate 71 in the Y-axis direction is 3 mm or more and 8 mm or less, for example.

The optical fiber 74 is located near the center of base plate 71 in the Y-axis direction. The optical fibers 72a and 72b are disposed on a positive direction side in the Y-axis relative to the optical fiber 74, and the optical fibers 72c and 72d are disposed on a negative direction side in the Y-axis relative to the optical fiber 74. That is, the optical fibers 72a, 72b, 74, 72c, and 72d are arranged in this order along the Y-axis.

Figure 3B:
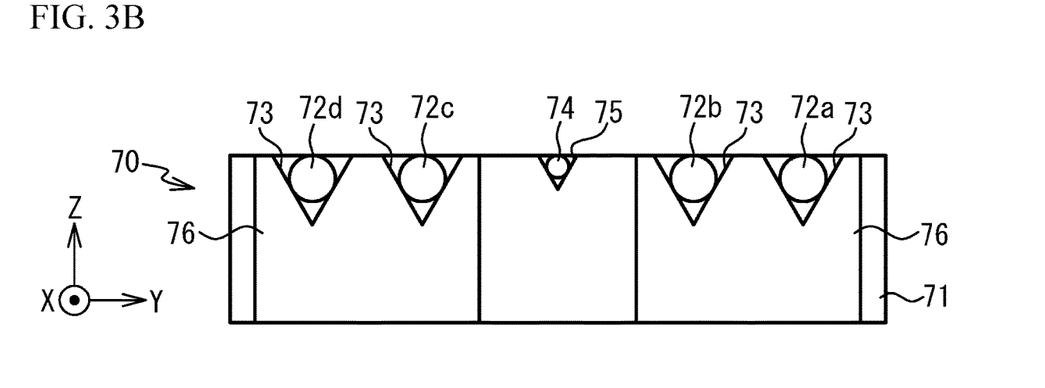
FIG. 3B is a front view illustrating an optical fiber array.

FIG. 3B is a front view illustrating the optical fiber array 70. As illustrated in FIG. 3B, four V-shaped grooves 73 and one V-shaped groove 75 are provided on the top surface of the base plate 71. The grooves 73 and 75 extend in the X-axis direction. Each of the grooves 73 accommodates any one of the optical fibers 72a to 72d. The optical fiber 74 is disposed in the groove 75.

The optical fiber 74 is a single-mode optical fiber (SMF) having polarization maintaining characteristics, and is a lensed fiber with a convex-shaped tip. The glass of the optical fiber 74 is coated. The outer diameter of the optical fiber 74 including the coating is 250 μm, for example, and the diameter of the core (core diameter) is 8 μm, for example. A single-wavelength and single-mode laser beam having a wavelength in the range from 1.53 μm to 1.57 μm is propagated through the optical fiber 74.

The optical fibers 72a to 72d are multi-mode optical fibers (MMFs). The core diameter of each of the optical fibers 72a to 72d is larger than the core diameter of the optical fiber 74, and is 400 μm for example. The length of each of the optical fibers 72a to 72d is 730 μm, for example, and the bending radius of each of the optical fibers 72a to 72d is 47 mm, for example.

A surface 70a of the optical fiber array 70 perpendicular to the X-axis positive direction faces the optical modulation device 10. One end of each of the optical fibers 72a to 72d is located on the surface 70a. The surface 70a is provided with two polarizing plates 76. One of the polarizing plates 76 covers the one end of each of the optical fibers 72a and 72b. The other of the polarizing plate 76 covers the one end of each of the optical fibers 72c and 72d. The one end of the optical fiber 74 protrudes outward in the X-axis positive direction from the surface 70a. An amount of the protrusion of the optical fiber 74 from the surface 70a is 0.1 mm, for example.

As illustrated in FIG. 1, the other end of the optical fiber 72a is optically connected to the optical power meter 56a using a connector 55. The other end of the optical fiber 72b is optically connected to the optical power meter 56b. The other end of the optical fiber 72c is optically connected to the optical power meter 56c. The other end of the optical fiber 72d is optically connected to the optical power meter 56d. The other end of the optical fiber 74 is optically connected to the wavelength tunable laser source 54 using a connector 53.

(Optical Modulation Device)

The optical modulation device 10 illustrated in FIG. 3A is a one-input four-output device which is formed of, for example, a gallium arsenide (GaAs)-based semiconductor or an indium phosphide (InP)-based semiconductor, and includes a plurality of Mach-Zehnder modulators. The optical modulation device 10 has a substrate 11, a plurality of waveguides, electrodes for adjusting a phase, and pads for input and output.

The substrate 11 is a semiconductor substrate formed of a GaAs-based compound semiconductor or an InP-based compound semiconductor. Electrodes 40a to 40h, electrodes 42a to 42h, electrodes 44a to 44d, a plurality of pads 46 and a plurality of pads 48 are provided on the top surface of the substrate 11. In FIG. 3A, electrodes are illustrated as hatched. Wiring patterns (not illustrated) which electrically connect the plurality of electrodes and the plurality of pads are also provided on the substrate 11.

A surface 10a of the optical modulation device 10 in the X-axis negative direction faces the surface 70a of the optical fiber array 70. One incident port 14 (incident part) and four emitting ports 12a, 12b, 12c and 12d (emitting part) are provided on the surface 10a. The incident port 14 is located near the center of the substrate 11 in the Y-axis direction. The emitting ports 12a and 12b are provided on the positive direction side in the Y-axis relative to the incident port 14, and the emitting ports 12c and 12d are provided on the negative direction side in the Y-axis relative to the incident port 14. That is, the emitting ports 12a and 12b, the incident port 14, and the emitting ports 12c and 12d are arranged in this order along the Y-axis. Among the four emitting ports, for example, the emitting ports 12b and 12c emit signal lights, and the emitting ports 12a and 12d emit monitoring lights.

The emitting port 12a faces a distal end of the optical fiber 72a of the optical fiber array 70 in the X-axis direction. The emitting port 12b faces a distal end of the optical fiber 72b in the X-axis direction. The emitting port 12c faces a distal end of the optical fiber 72c in the X-axis direction. The emitting port 12d faces a distal end of optical fiber 72d in the X-axis direction. The incident port 14 faces a distal end of the optical fiber 74 in the X-axis direction.

Portions (i.e., electrodes, waveguides, couplers and the like) included from the incident port 14 to the emitting ports 12a and 12b function as one Mach-Zehnder modulator 13a (first main Mach-Zehnder modulator) as a whole. Other portions included from the incident port 14 to the emitting ports 12c and 12d function as another Mach-Zehnder modulator 13b (second main Mach-Zehnder modulator) as a whole. Each of Mach-Zehnder modulators 13a and 13b further includes two Mach-Zehnder modulators (sub Mach-Zehnder modulators).

One end of a waveguide 16 is coupled to the incident port 14, and the other end thereof is coupled to a coupler 18. The waveguide 16 branches into two waveguides 20a and 20b at the coupler 18. The waveguide 20a branches into two waveguides 24a and 24b at a coupler 22a. The waveguide 24a branches into two waveguides 28a and 28b at a coupler 26a. The waveguides 28a and 28b merge at a coupler 30a to form a waveguide 32a. The waveguide 24b branches into two waveguides 28c and 28d at a coupler 26b. The waveguide 28c and 28b merge at a coupler 30b to form a waveguide 32b. Each of the waveguides 28a to 28d bends and folds back twice. Each of the waveguides 32a and 32b bends and folds back once.

The waveguides 32a and 32b merge at a coupler 34a and branch into waveguides 36a and 36b after passing through the coupler 34a. One end of the waveguide 36a is coupled to the coupler 34a, and the other end of the waveguide 36a is coupled to the emitting port 12a. One end of the waveguide 36b is coupled to the coupler 34a, and the other end of the waveguide 36b is coupled to the emitting port 12b. Portions (i.e., electrodes, waveguides and the like) included from the coupler 26a to the coupler 30a function as one sub Mach-Zehnder modulator as a whole. Other portions included from the coupler 26b to the coupler 30b function as another sub Mach-Zehnder modulator as a whole.

On the waveguide 28a, the electrodes 40a and 42a are provided in this order from the coupler 26a toward the coupler 30a. On the waveguide 28b, the electrodes 40b and 42b are provided in this order from the coupler 26a toward the coupler 30a. On the waveguide 28c, the electrode 40c and 42c are provided in this order from the coupler 26b toward the coupler 30b. On the waveguide 28d, the electrodes 40d and 42d are provided in this order from the coupler 26b toward the coupler 30b. The electrode 44a is provided on the waveguide 32a, and the electrode 44b is provided on the waveguide 32b.

In the Mach-Zehnder modulator 13b, the waveguides 20b, 24d, 28e to 28h, 32c, 32d, 36c and 36d, the couplers 22b, 26c, 26d, 30c, 30d, and 34b, the emitting ports 12c and 12d are arranged in the same way as the corresponding configuration of the Mach-Zehnder modulator 13a. Portions (i.e., electrodes, waveguides and the like) included from the coupler 26c to the coupler 30c function as one sub Mach-Zehnder modulator as a whole. Other portions included from the coupler 26d to the coupler 30d function as another sub Mach-Zehnder modulator as a whole.

On the waveguide 28e, the electrodes 40e and 42e are provided in this order from the coupler 26c toward the coupler 30c. On the waveguide 28f, the electrodes 40f and 42f are provided in this order from the coupler 26c toward the coupler 30c. On the waveguide 28g, the electrodes 40g and 42g are provided in this order from the coupler 26d toward the coupler 30d. On the waveguide 28h, the electrodes 40h and 42h are provided in this order from the coupler 26d toward the coupler 30d. The electrode 44c is provided on the waveguide 32c, and the electrode 44d is provided on the waveguide 32d.

The plurality of pads 46 and the plurality of pads 48 are provided on the top surface of the substrate 11 in the optical modulation device 10. The pads 46 are, for example, phase-adjustment electrodes used for adjusting the phase of a light, and are electrically connected to the electrodes 42a to 42h and the electrodes 44a to 44d, respectively. The pads 48 are, for example, optical modulation electrodes used for modulating a light, and are electrically connected to the electrodes 40a to 40h, respectively, and also electrically connected to the pins 67 of the contact probe 66 illustrated in FIG. 1, respectively.

Light is made incident on the optical modulation device 10 from the incident port 14, and the light is emitted from each of the emitting ports 12a to 12d. A radio frequency (RF) signal is inputted to each of the electrodes 40a to 40h to modulate the light. A voltage is applied to each of the electrodes 42a to 42h and the electrodes 44a to 44d to adjust the phase of the light. For example, a phase difference between the emitted light from the emitting port 12b and the emitted light from the emitting port 12c can be adjusted to be $\pi/2$ or the like. The phase can be adjusted such that the intensity of the light (signal light) emitted from each of the emitting ports 12b and 12c is maximized and the intensity of the light (monitor light) emitted from each of the emitting ports 12a and 12d is minimized.

As will be described later, in the inspection of the optical modulation device 10, the optical characteristics of the optical modulation device 10 are evaluated after aligning the incident port 14 of the optical modulation device 10 and the optical fiber 74 of the optical fiber array 70. In the alignment, the light is made incident on the incident port 14 of the optical modulation device 10 from the wavelength tunable laser source 54, and the intensities of the lights emitted from the emitting ports 12a to 12d are detected using the optical power meters 56a to 56d, respectively.

A table 1 indicates the intensities of lights emitted from a plurality of optical modulation devices 10. In the examples of the table 1, each optical modulation device 10 is in an initial phase state, and the phase of the light in each optical modulation device 10 is not adjusted. The incident port 14 and the optical fiber 74 are aligned, and the intensity of the light incident on the incident port 14 is maximum. When the incident port 14 and the optical fiber 74 deviate from optimum positions, the intensity of the light incident on the incident port 14 decreases, and the intensity of the emitted light also decreases from each intensity of the examples illustrated in the table 1.

TABLE 1

| Optical modulation device 10 | No. 1 | No. 2 | No. 3 | ... |
|---|---|---|---|---|
| Emitting port 12a | P/6 | P/3 | 4P/10 | . |
| Emitting port 12b | P/3 | P/6 | P/10 | . |
| Emitting port 12c | P/6 | P/3 | P/10 | . |
| Emitting port 12d | P/3 | P/6 | 4P/10 | |
| Total value | P | P | P | P |

In the table 1, the plurality of the optical modulation devices 10 are designated as No. 1 to No. 3. Due to production tolerance, the balance of light intensity between the emitting ports may change for each optical modulation device 10. In the optical modulation device 10 of No. 1, the intensity of the emitted light from each of the emitting ports 12a and 12c is P/6, and the intensity of the emitted light from each of the emitting ports 12b and 12d is P/3. A total value of the intensities of the four emitted lights is P.

In the optical modulation device 10 of No. 2, the intensity of the emitted light from each of the emitting ports 12a and 12c is P/3, and the intensity of the emitted light from each of the emitting ports 12b and 12d is P/6. In the optical modulation device 10 of No. 3, the intensity of the emitted light from each of the emitting ports 12a and 12d is 4P/10, and the intensity of the emitted light from each of the emitting ports 12b and 12c is P/10. The balance of intensity between the emitting ports also changes for each of a plurality of other optical modulation devices 10 omitted in the table 1. On the other hand, the total value of the intensities of the four emitted lights in each of the other optical modulation devices 10 omitted in the table 1 is also P.

For example, it is assumed that the alignment is performed using the emitted light from the emitting port 12b and without using the emitted lights from other three emitting ports. The light is made incident on the incident port 14 from the wavelength tunable laser source 54 through the optical fiber 74, and the light emitted from the emitting port 12b is received by the optical power meter 56b. The position of the optical fiber array 70 is adjusted using the aligning stage 60 so that an electric signal (voltage) outputted by the optical power meter 56b is maximized.

However, as illustrated in the table 1, the balance of intensity of the emitted lights changes for each of the plurality of optical modulation devices 10. The intensity of the emitted light from the emitting port 12b is P/3 in No. 1, P/6 in No. 2 which is a half of P/3, and a smaller P/10 in No. 3. As described above, the intensities of the emitted light from the emitting port 12b differs greatly from each other in the plurality of optical modulation devices 10. That is, the intensity of the emitted light changes depending on the positional relation between the incident port 14 and the optical fiber 74, and also changes due to production tolerance of the optical modulation device 10. Therefore, it is difficult to perform the alignment using only the intensity of the emitted light from the emitting port 12b.

For example, the emitting port may be switched for each optical modulation device 10 such that the alignment of No. 1 is performed using the emitted light from the emitting port 12b and the alignment of No. 2 is performed using the emitted light from the emitting port 12a. However, the step of the alignment gets complicated and is hard to automate.

As illustrated in the table 1, the total value of the intensities of the emitted lights in each optical modulation device 10 is P. That is, in an aligned state, the balance of the intensities of the emitted lights changes for each optical modulation device 10, but the total value of the intensities of the emitted lights is not changed. Therefore, in all the optical modulation devices 10, the total value increases or decreases depending on the positional relationship between the incident port 14 and the optical fiber 74. As the positional relationship approaches the optimum positional relationship (aligned state), the total value approaches the maximum value P. As the positional relationship is deviated from the optimum positional relationship, the total value decreases. Therefore, in the present embodiment, the alignment is automatically performed based on the total value.

Figure 4A:
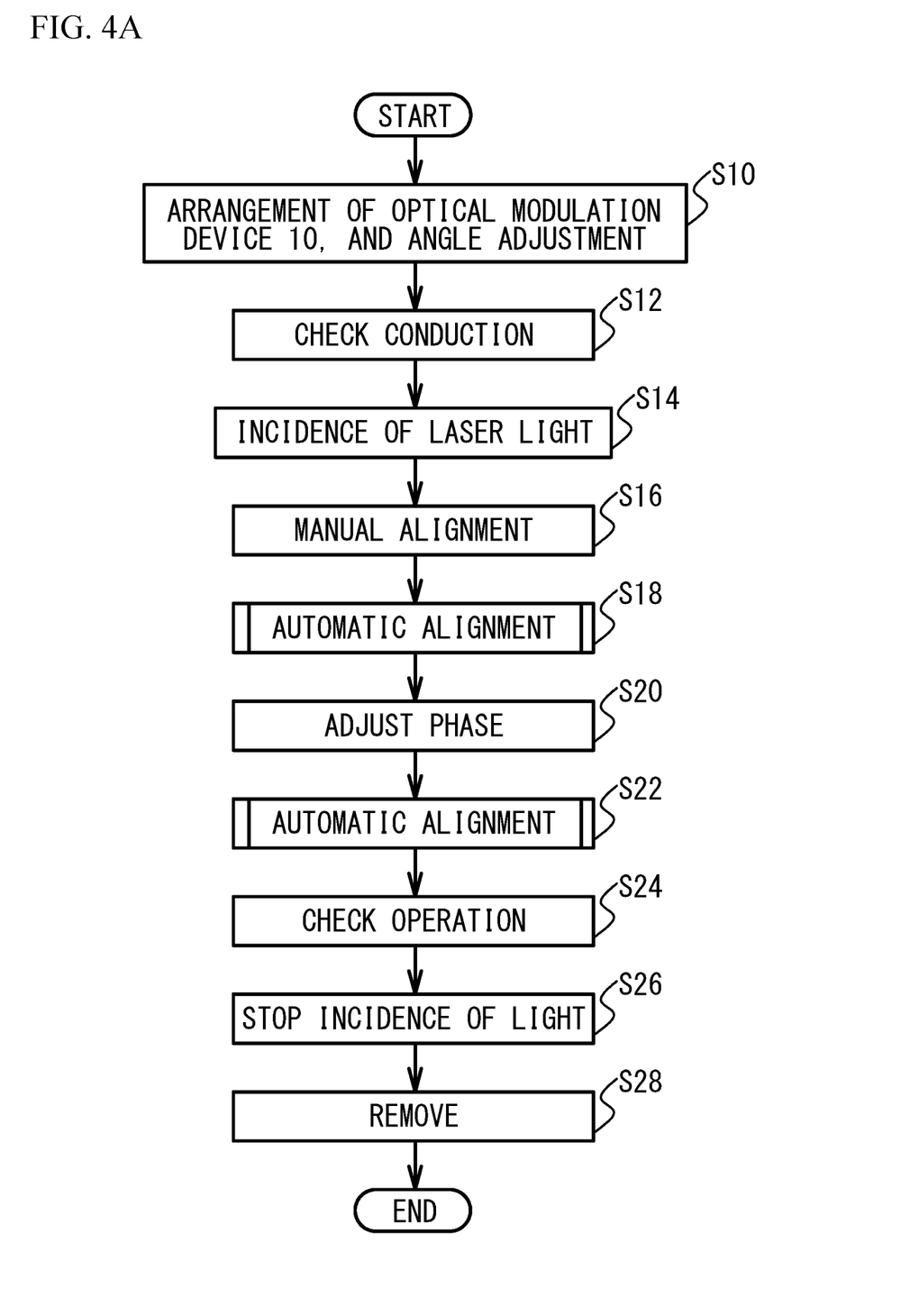
FIG. 4A is a flowchart illustrating steps of measuring optical characteristics.
Figure 4B:
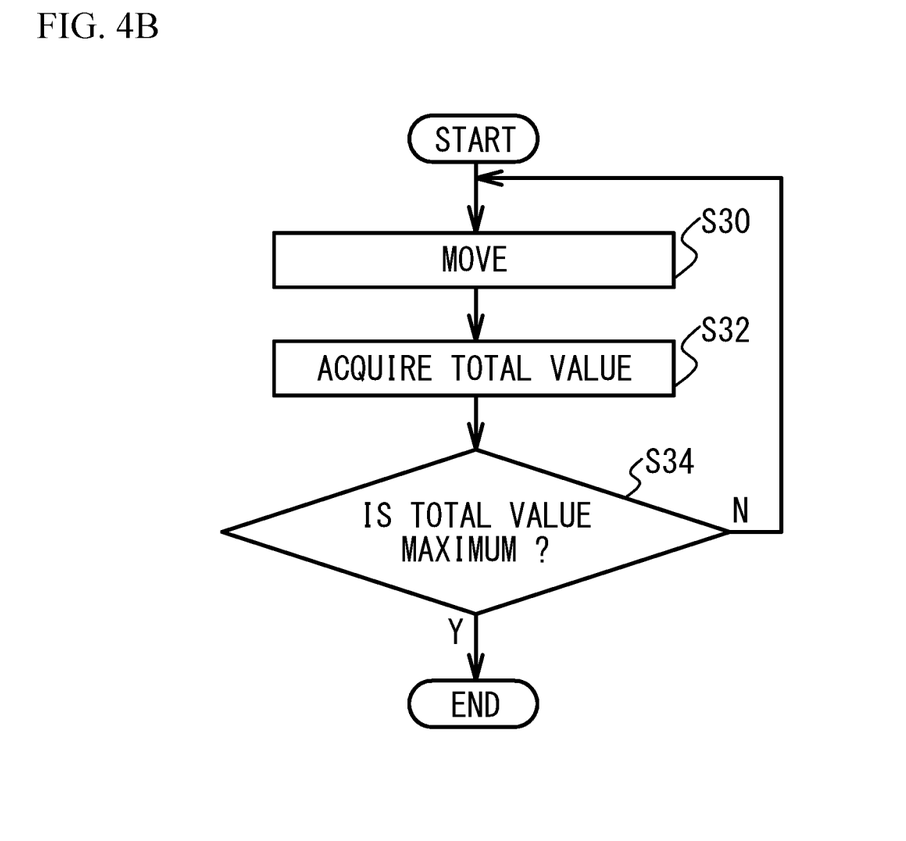
FIG. 4B is a flowchart illustrating a step of alignment.

FIG. 4A is a flowchart illustrating the steps of measuring the optical characteristics. FIG. 4B is a flowchart illustrating the step of the alignment. The step of measuring the optical characteristics includes the step of the alignment illustrated in FIG. 4B and is performed, for example, as a part of the inspection of the optical modulation device 10 in the manufacturing steps of the optical modulation device 10. The optical fiber array 70 is disposed on the aligning stage 60.

An operator places the optical modulation device 10 on the temperature control stage 64 and adjusts the angle adjustment stage 65 while watching an image capture by the camera 59 with the monitor 57. The reference line displayed on the monitor 57 is used to adjust an angle between the surface 10a of the optical modulation device 10 and the surface 70a of the optical fiber array 70 so as to arrange the surfaces 10a and 70a in parallel (Step S10 in FIG. 4A).

The pins 67 of the multi-contact probe 66 are contacted with the pads 46 and 48 of the optical modulation device 10. For example, a voltage of 1V is applied from the voltage current source 58 to the electrode of the optical modulation device 10 through the multi-contact probe 66. A current outputted from the optical modulation device 10 is detected by the voltage current source 58, and the operator checks whether the current is 10 µA or more. Thereby, the electrical conduction between the voltage current source 58, the multi-contact probe 66 and the optical modulation device 10 is checked (Step S12). After the electrical conduction is checked, the application of voltage to the optical modulation device 10 is stopped.

A laser light having a wavelength of, for example, 1.55 µm is made incident on the incident port 14 of the optical modulation device 10 from the wavelength tunable laser source 54 through the optical fiber 74 of the optical fiber array 70 (Step S14). The lights are emitted from the emitting ports 12a to 12d of the optical modulation device 10. The emitted lights are propagated through optical fibers 72a to 72d and are made incident on the optical power meters 56a to 56d, respectively. Each of the optical power meters 56a to 56d outputs a voltage corresponding to the intensity of the emitted light to the current converter 51. The current converter 51 converts the voltages outputted from the optical power meters 56a to 56d into currents, and calculates the total value of the currents. No voltage is applied to the optical modulation device 10.

Next, the alignment between the incident port 14 of the optical modulation device 10 and the optical fiber 74 of the optical fiber array 70 is performed. First, rough manual alignment is performed (manual alignment, Step S16), and then precise alignment is automatically performed (automatic alignment, Step S18).

The manual alignment is performed as described below, for example. The operator checks the image captured by the camera 59 with the monitor 57, for example, and manually moves the aligning stage 60 to adjust the position of optical fiber array 70 so that the total value of the currents inputted from the current converter 51 to the automatic aligning controller 52 is 1 µA or more (Step S16).

The automatic alignment is carried out in the steps illustrated in FIG. 4B. The position control part 81 controls the automatic aligning controller 52 to move the position of the optical fiber array 70 on the aligning stage 60 (Step S30). The total-value acquisition part 82 acquires the total value of the currents calculated by the current converter 51 (Step S32). The position control part 81 determines whether the total value of the currents is maximum (Step S34). The maximum of the total value of the currents corresponds to the total value P of the intensities of the four emitted lights illustrated in the table 1. When it is determined to be "NO" in the step S34, the control part 80 re-executes the steps S30 and S32. When it is determined to be "YES" in the step S34, the control of the automatic alignment ends. That is, the position control part 81 moves the optical fiber array 70, thereby preforming the alignment so as to maximize the total value of the currents. After the automatic alignment, the step S20 illustrated in FIG. 4A is performed.

As illustrated in FIG. 4A, the phase of the emitted light of the optical modulation device 10 is adjusted (Step S20). The voltage control part 84 controls the voltage current source 58, applies a phase adjustment voltage from the voltage current source 58 to each of electrodes 42a to 42h of the optical modulation device 10, and sweeps the phase adjustment voltage from 1 V to 10 V, for example. The voltage control part 84 obtains the phase adjustment voltage such that the intensity of the light emitted from each of the emitting ports 12b and 12c among the four emitting ports is maximized, for example. The voltage control part 84 then applies the phase adjustment voltage from the voltage current source 58 to each of electrodes 44a to 44d, and sweep the phase adjustment voltage from 1 V to −10 V, for example, to determine the phase adjustment voltage such that the intensity of the light is maximized.

After the phase is adjusted, the automatic alignment is performed again (Step S22). The automatic alignment in the step S22 is executed according to the procedure illustrated in FIG. 4B in the same manner as in the step S18. That is, the position of the optical fiber array 70 is adjusted so that the total value of the currents corresponding to the intensities of the emitted lights after the phase adjustment is maximized.

The control part 80 checks the operation of the optical modulation device 10 by using a program stored in the storage device 103 (Step S24). For example, the voltage applied from the voltage current source 58 to the optical modulation device 10 is swept, and the intensity of the emitted light from each of the four emitting ports is measured by the optical power meter corresponding to each emitting port.

After checking the operation, the light-source control part 83 stops the incidence of the light from the wavelength tunable laser source 54 (Step S26). The optical fiber array 70 is moved away from the optical modulation device 10 using the aligning stage 60. The pins 67 of the multi-contact probe 66 are separated from the pads 46 and 48 of the optical modulation device 10. The optical modulation device 10 is removed from the temperature control stage 64 (Step S28). Thus, the measurement of the optical characteristics of one optical modulation device 10 is completed. The processes illustrated in FIGS. 4A and 4B are repeated to measure the optical characteristics of the plurality of optical modulation devices 10.

According to the present embodiment, each of the optical power meters 56a to 56d receives the emitted light from the corresponding emitting port in the plurality of emitting ports 12a to 12d of the optical modulation device 10, and outputs the voltage corresponding to the intensity of the emitted light. The current converter 51 converts the voltage into the current and obtains the total value of the currents. The control part 80 performs the alignment of the incident port 14 of the optical modulation device 10 and the optical fiber 74 based on the total value. In any of the plurality of optical modulation devices 10, the total value of the currents becomes a constant value. The total value of the currents becomes small when the positions of the incident port 14 of the optical modulation device 10 and the optical fiber 74 are deviated from the positions in the aligned state. The total value of the currents becomes large when the positions the incident port 14 of the optical modulation device 10 and the optical fiber 74 are the positions in the aligned state. Therefore, the use of the total value of the currents allows the automatic alignment. The automatic alignment reduces the time and effort required for the alignment, compared to the manual alignment.

Specifically, the alignment is performed such that the total value is maximized. By using the current value (maximum value) corresponding to the total value P of the intensity as a common standard for the plurality of optical modulation devices 10, the automatic alignment can be performed. A threshold value may be used instead of the maximum value, and for example, a state in which the total value becomes equal to or larger than the threshold value may be defined as the aligned state. By storing a reference value such as the maximum value or the threshold value in the storage device 103 of the control part 80, the automatic alignment can be performed.

The incident port 14 and the emitting ports 12a to 12d are provided on the surface 10a of the optical modulation device 10. The optical fiber array 70 has the optical fibers 72a to 72d and 74. By making the surface 10a of the optical modulation device 10 and the surface 70a of the optical fiber array 70 face each other, the emitting ports 12a to 12d and the optical fibers 72a to 72d face each other, and the incident port 14 and the optical fiber 74 face each other. The light can be made incident on the incident port 14 using the optical fiber 74. The lights emitted from the emitting ports 12a to 12d can be received by the optical power meters 56a to 56d through the optical fibers 72a to 72d, respectively.

Each of the optical fibers 72a to 72d is a large-diameter fiber having a larger diameter than optical fiber 74. Therefore, the loss of the emitted lights from the emitting ports 12a to 12d can be suppressed, and the lights can be received by the optical fibers 72a to 72d.

By adjusting the position of the optical fiber array 70 using the aligning stage 60, the alignment of the optical fiber 74 and the incident port 14 can be performed. In the optical fiber array 70, the relative position of each of the optical fibers 72a to 72d with respect to the optical fiber 74 is fixed. In the optical modulation device 10, the relative position of each of the emitting ports 12a to 12d with respect to the incident port 14 is fixed. The alignment of the optical fiber 74 and the incident port 14 is accompanied by the alignment of the emitting ports 12a to 12d and the optical fibers 72a to 72d at the same time. As a result, the step is simplified. In the step of the alignment, the position of at least one of the optical fiber array 70 and the optical modulation device 10 may be adjusted. For example, the position of the optical modulation device 10 is adjusted by moving the angle adjustment stage 65.

The alignment is automatically performed without applying the voltage to each electrode of the optical modulation device 10 and without adjusting the phase of the light (Step S18 in FIG. 4A). The alignment is performed automatically even when the phase of the light is adjusted by applying a voltage to each electrode of the optical modulation device 10 (Step S22). Since the above two alignment steps are performed automatically, the time and effort required for the alignment is reduced, as compared to the manual alignment.

The optical modulation device 10 has the plurality of emitting ports, and may have four or more emitting ports, or may have four or less emitting ports. The emitting ports 12a to 12d may be provided on the surface 10a, and the incident port 14 may be provided on a surface other than the surface 10a. The four optical fibers 72a to 72d are disposed in the optical fiber array 70. The optical fiber 74 may not be provided on the optical fiber array 70, but may be arranged at a position facing the incident port 14.

The embodiments of the present disclosure have been described above. However, the embodiments of the present disclosure disclosed above are only illustrative, and the scope of the present invention is not limited to the specific embodiments of the disclosure. It is to be understood that the scope of the present invention is defined in the appended claims and includes equivalence of the description of the claims and all changes within the scope of the claims.

What is claimed is:

1. A method for measuring optical characteristics of a Mach-Zehnder type optical modulation device having an incident part, a waveguide for propagating light incident from the incident part, and a plurality of emitting parts each for emitting light, the method comprising:
   inputting light from a light source to the incident part of the optical modulation device through a first optical fiber;
   receiving emitted lights emitted from the plurality of emitting parts of the optical modulation device by a plurality of light receivers;
   obtaining a total value of currents by converting electric signals into currents and summing the currents, the electric signals being outputted by the plurality of light receivers receiving the emitted lights; and
   aligning the incident part of the optical modulation device and the first optical fiber based on the total value of currents.

2. The method for measuring the optical characteristics of the Mach-Zehnder type optical modulation device according to claim 1, wherein in the aligning the incident part of the optical modulation device and the first optical fiber, the aligning is performed such that the total value of currents is maximized.

3. The method for measuring the optical characteristics of the Mach-Zehnder type optical modulation device according to claim 1, wherein the incident part and the plurality of emitting parts are provided on one surface of the optical modulation device, the method further comprises facing an optical fiber array including the first optical fiber and a plurality of second optical fibers to the one surface of the optical modulation device before the inputting the light from the light source to the incident part, and the receiving the emitted lights by the plurality of light receivers includes receiving the emitted lights by the plurality of light receivers through the plurality of second optical fibers.

4. The method for measuring the optical characteristics of the Mach-Zehnder type optical modulation device according to claim 3, wherein the aligning the incident part of the optical modulation device and the first optical fiber includes adjusting a position of at least one of the optical fiber array and the optical modulation device based on the total value of currents.

5. The method for measuring the optical characteristics of the Mach-Zehnder type optical modulation device according to claim 1, wherein the aligning the incident part of the optical modulation device and the first optical fiber includes:

aligning the incident part of the optical modulation device and the first optical fiber without applying a voltage to an electrode provided on the waveguide of the optical modulation device; and aligning the incident part of the optical modulation device and the first optical fiber with applying a voltage to the electrode provided on the waveguide of the optical modulation device.

6. An apparatus for measuring optical characteristics of a Mach-Zehnder type optical modulation device having an incident part, a waveguide for propagating light incident from the incident part, and a plurality of emitting parts each for emitting light, the apparatus comprising:

a first optical fiber configured to input light emitted from a light source to the incident part of the optical modulation device, a plurality of light receivers configured to output electric signals by inputting emitted lights emitted from the plurality of emitting parts of the optical modulation device;

a current converter configured to obtain a total value of currents by converting the electric signals outputted by the plurality of light receivers into currents and summing the currents; and a controller configured to align the incident part of the optical modulation device and the first optical fiber based on the total value of currents.

7. The apparatus for measuring the optical characteristics of the Mach-Zehnder type optical modulation device according to claim 6, further comprising:

an optical fiber array including the first optical fiber and a plurality of second optical fibers, wherein the plurality of light receivers receive the emitted lights through the plurality of second optical fibers, and the controller performs the aligning by adjusting a position of at least one of the optical fiber array and the optical modulation device based on the total value.

8. The apparatus for measuring the optical characteristics of the Mach-Zehnder type optical modulation device according to claim 7, wherein each second optical fiber has a larger diameter than the first optical fiber.

9. A non-transitory computer-readable medium having stored therein a program for causing a computer to execute a process, the computer measuring optical characteristics of a Mach-Zehnder type optical modulation device having an incident part, a waveguide for propagating light incident from the incident part, and a plurality of emitting parts each for emitting light, the process comprising:

inputting light emitted from a light source to the incident part of the optical modulation device through an optical fiber;

obtaining a total value of currents by converting electric signals into currents and summing the currents, the electric signals being outputted by a plurality of light receivers receiving emitted lights from the plurality of emitting parts of the optical modulation device; and aligning the incident part of the optical modulation device and the first optical fiber based on the total value of currents.

* * * * *